United States Patent [19]

Reynolds et al.

[11] E Patent Number: Re. 33,200

[45] Reissued Date of Patent: Apr. 17, 1990

[54] ONE-PIECE AUTOMOTIVE TRUNK LINER

[75] Inventors: David P. Reynolds, Charlotte; John D. Shepard, Marion; Samuel L. Stone, Jr., Old Fort, all of N.C.

[73] Assignee: Collins & Aikman, New York, N.Y.

[21] Appl. No.: 333,643

[22] Filed: Apr. 4, 1989

Related U.S. Patent Documents

Reissue of:

[64] Patent No.: 6,732,071
Issued: Jun. 16, 1987
Appl. No.: 918,515
Filed: Oct. 14, 1986

[51] Int. Cl.[4] ..... B62D 33/02

[52] U.S. Cl. ..... 296/39.1; 220/415

[58] Field of Search ..... 296/39.1; 220/415; 217/3 R; 428/35

[56] References Cited

U.S. PATENT DOCUMENTS

| | | | |
|---|---|---|---|
| D. 236,259 | 8/1975 | Hefner | D12/156 |
| D. 248,386 | 7/1978 | Hefner | D12/98 |
| 2,060,362 | 11/1936 | Zurcher | 296/1 |
| 2,405,423 | 8/1946 | Hayes | 154/44 |
| 2,911,253 | 11/1959 | Dewey | 296/39 |
| 2,912,137 | 11/1959 | Taylor | 220/65 |
| 3,396,070 | 8/1968 | Gambill et al. | 161/119 |
| 3,881,768 | 5/1975 | Nix | 296/39 R |
| 3,953,632 | 4/1976 | Robinson | 428/95 |
| 4,016,318 | 4/1977 | DiGioia et al. | 428/95 |
| 4,035,215 | 7/1977 | Goldstone | 156/245 |
| 4,096,303 | 6/1978 | Doerfling | 428/91 |
| 4,169,176 | 9/1979 | Hartmann et al. | 428/95 |
| 4,186,230 | 1/1980 | Sinclair et al. | 428/95 |
| 4,199,634 | 4/1980 | Pole et al. | 428/95 |
| 4,230,755 | 10/1980 | Morris | 428/95 |
| 4,242,395 | 12/1980 | Zuckermann et al. | 428/96 |
| 4,279,439 | 7/1981 | Cantieri | 296/39 R |
| 4,288,490 | 9/1981 | Alfter et al. | 428/315 |
| 4,368,282 | 1/1983 | Bogdany | 524/58 |
| 4,374,884 | 2/1983 | Kowk et al. | 428/95 |
| 4,529,639 | 7/1985 | Peoples, Jr. et al. | 428/95 |
| 4,568,581 | 2/1986 | Peoples, Jr. | 428/35 |
| 4,579,764 | 4/1986 | Peoples, Jr. et al. | 428/95 |
| 4,581,272 | 4/1986 | Walters et al. | 428/88 |
| 4,592,583 | 6/1986 | Dresen et al. | 296/39 R |
| 4,693,507 | 9/1987 | Dresen et al. | 296/39 R |

FOREIGN PATENT DOCUMENTS

| | | |
|---|---|---|
| 58-36737 | 3/1983 | Japan . |
| 862378 | 3/1961 | United Kingdom . |

*Primary Examiner*—Robert R. Song
*Attorney, Agent, or Firm*—Bell, Seltzer, Park and Gibson

[57] ABSTRACT

A one-piece trunk liner for an automobile trunk compartment wherein the trunk liner is formed of fibrous material and molded to form a relatively stiff body having a center floor cover panel and a plurality of panels extending along the sides of the center floor panel and integrally connected thereto and extending upwardly and outwardly from the center floor cover panel so as to be in outwardly diverging relation to the center floor cover panel. The stiffness of the molded fibrous body and the outwardly diverging relationship of the plurality of panels permit the panels to resiliently engage inner wall surfaces of the trunk when the panels are biased inwardly toward an upright position when mounted in the trunk to thereby facilitate mounting the trunk liner in the trunk of an automobile and the maintaining of the trunk liner in the installed position in engagement with the walls of the trunk.

27 Claims, 7 Drawing Sheets

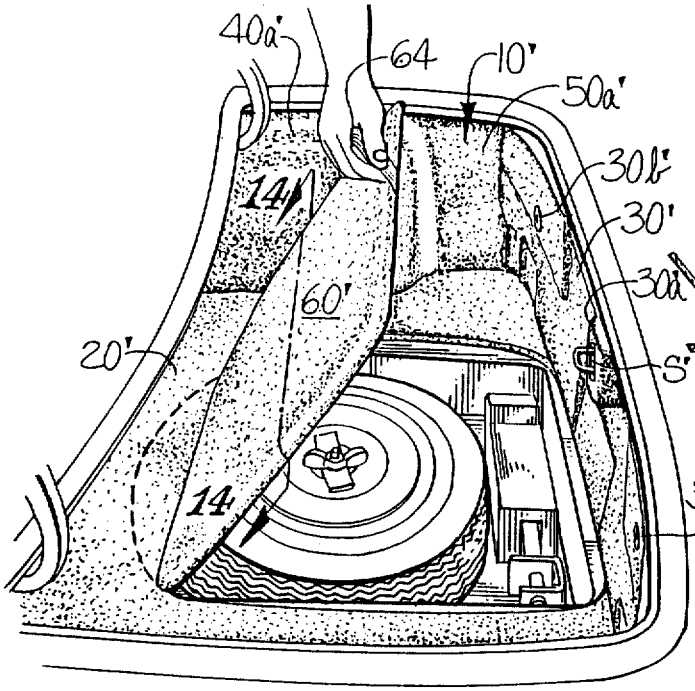
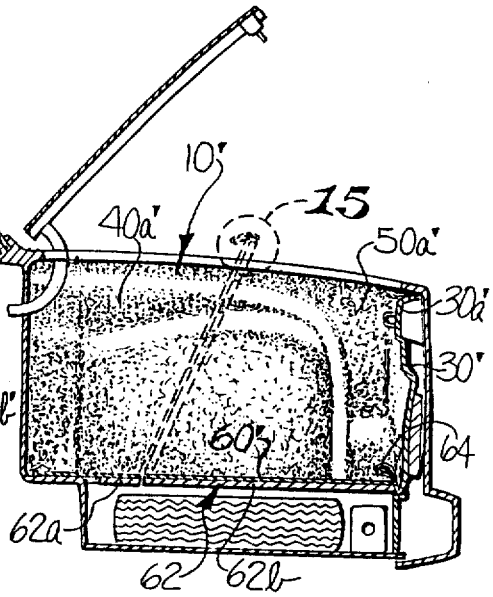
Fig-11
Fig-12
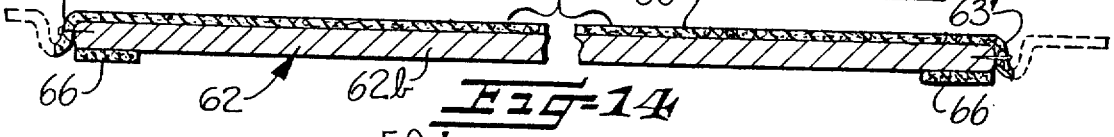
Fig-14
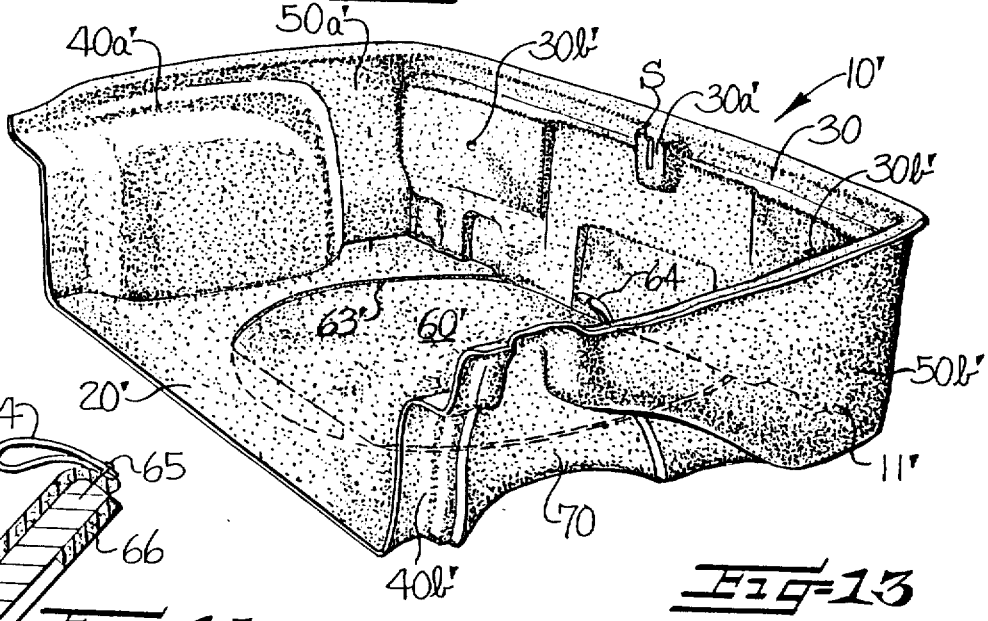
Fig-13
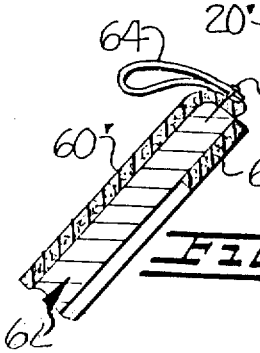
Fig-15

ONE-PIECE AUTOMOTIVE TRUNK LINER

Matter enclosed in heavy brackets [ ] appears in the original patent but forms no part of this reissue specification; matter printed in italics indicates the additions made by reissue.

BACKGROUND OF THE INVENTION

This invention relates to trunk liners and more particularly to trunk liners for an automobile trunk compartment.

For many years, liners for the trunk compartment of automobiles have been of multi-piece construction with typically seven to eleven pieces being separately formed and fitted together and held by fasteners for lining the trunk compartment. In order to position and interconnect the separate pieces to form an entity trunk liner, many of the pieces have been arranged in overlapping relationship. Needless to say, the separate forming of the many pieces and the fitting of the same together to form the trunk liner has been an expensive, time consuming, and tedious procedure.

SUMMARY OF THE INVENTION

With the foregoing in mind, it is the primary object of this invention to provide a one-piece trunk liner which avoids the expensive and time consuming operation of separately forming individual pieces and the tedious operation of fitting and connecting together such separated pieces.

The one-piece trunk liner of this invention presents many attendant advantages over prior art practices. Of primary significance is the reduction of time in placing the trunk liner within the trunk compartment of the automobile. Further, considerable reduction in material has been realized, particularly the reduction in waste since only one integral trunk liner has to be trimmed as opposed to a plurality of separate parts being trimmed and fitted together. Further, no longer is there any problem in the matching of dye lots of the separate pieces which oftentimes come from different suppliers. Further, the grain direction of the textile fibers defining the upper pile surface of the trunk liner of this invention is of uniform direction since a single piece of fibrous material having uniform pile lie is utilized in forming the one-piece trunk liner. In prior art practices of interconnecting separate pieces together, the grain direction of the various pieces had to be kept in mind in order to present a uniform color appearance to the trunk liner to thereby obtain the desired aesthetic appearance of the liner.

It is a further object of this invention to provide an integrally molded fibrous trunk liner for an automobile trunk compartment wherein the trunk liner is molded in such a manner that the side walls thereof are formed so as to extend upwardly and outwardly in a diverging manner relative to the center floor cover panel so as to resiliently engage the side walls of the trunk compartment when the side walls of the liner are biased inwardly toward an upright position when installed and mounted in a trunk compartment. Not only does this resilient engagement of the trunk liner with the walls of the trunk compartment facilitate the mounting of the trunk liner in the trunk compartment but also the maintaining of the trunk liner in the installed position in engagement with the walls of the trunk compartment.

BRIEF DESCRIPTION OF THE DRAWINGS

Some of the objects and advantages of the present invention having been stated, others will appear as the description proceeds, when considered in conjunction with the accompanying drawings, in which

FIG. 11 is another top perspective view showing the trunk liner installed in the trunk compartment of an automobile and wherein the spare tire well cover is shown pivoted to an open position;

FIG. 12 is a transverse sectional view through the trunk compartment of an automobile taken substantially along Line 12—12 of FIG. 10, and wherein the cover for the spare tire well is shown in solid lines in closed position and in dotted lines in open position;

FIG. 13 is a perspective view of the completed trunk liner as the same would appear if removed intact from the compartment of an automobile;

FIG. 14 is an enlarged transverse sectional view of the spare tire cover taken substantially along Line 14—14 of FIG. 11;

FIG. 15 is an enlarged transverse sectional view taken within the dotted line area 15 of FIG. 12 and illustrating the manner in which the underside of the rigid lid of the spare tire cover is provided with cushion material to prevent rattling as by contact with the metal defining the opening of the spare tire well;

DETAILED DESCRIPTION OF THE DRAWINGS

Figure 1:
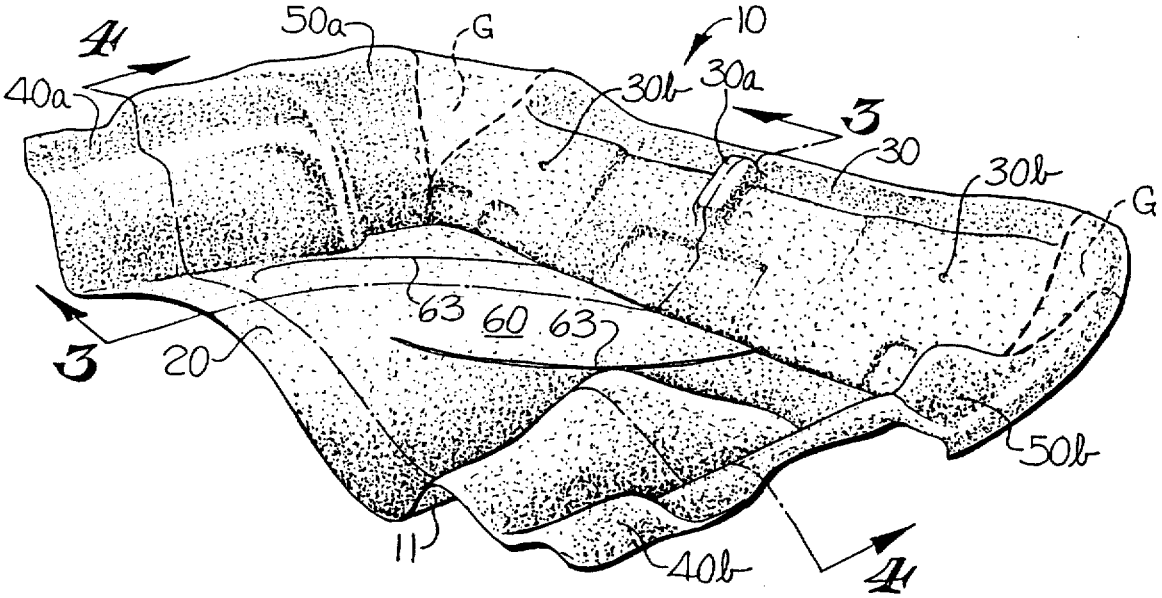
FIG. 1 is a top perspective view of the trunk liner substantially as the same appears when taken out of the mold.

Referring now specifically to the drawings and particularly to FIGS. 1 to 15, illustrating the first embodiment of the invention, reference numeral 10 designates the trunk liner as the same substantially appears when removed from the mold. This forms of the trunk liner as is best illustrated in FIGS. 1 to 4 of the drawings. On the other hand, reference numeral 10′ designates the completed trunk liner after the same has been suitably trimmed following the molding thereof and after the same has had other components added thereto on the backside, such as insulator pads and a rigid lid underlying a spare tire cover and serving as a cover for covering a spare tire well. This completed form of the first embodiment of the trunk liner is best illustrated in FIGS. 7 to 10 and 13.

For purposes of simplicity, the various elements or features of the completed trunk liner will bear the same reference numerals as the molded but unfinished trunk liner, but with the prime notation added thereto.

Figure 2:
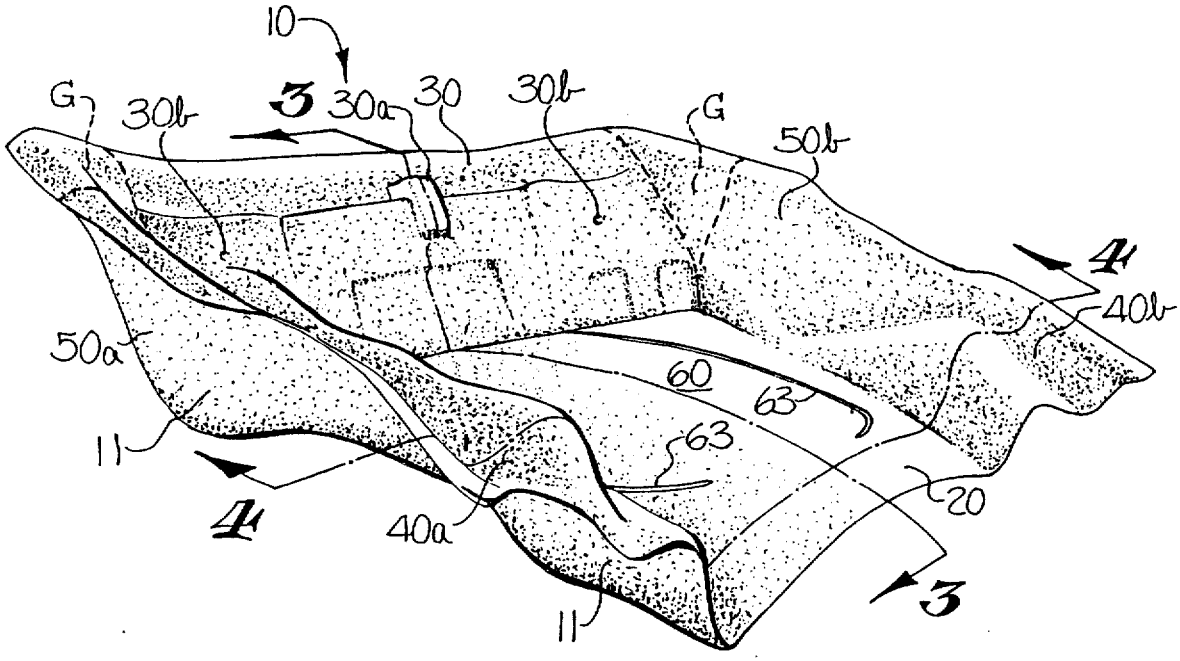
FIG. 2 is another top perspective view similar to FIG. 1 but looking from the opposite side of FIG. 1.

As best shown in FIGS. 1 and 2, the trunk liner 10 shown as removed from a typical pressure molding operation utilizing mating male and female molding components, comprises a center floor cover panel 20 and a plurality of panels extending along the sides of said center floor panel and integrally connected thereto. These panels include a rear end panel 30 having lower end portions connecting rearmost portions of said center floor panel 20 and divergingly extending upwardly and outwardly therefrom. Right and left rear wheel housing cover panels 40a and 40b, respectively are connected to opposite sides of said center floor cover panel 20 and divergingly extend upwardly and outwardly therefrom. Right and left inner panels 50a and 50b respectively are also connected to opposite sides of said center floor cover panel 20 and are divergingly arranged to extend upwardly and outwardly therefrom. These right and left inner panels 50 and 50a are positioned rearwardly of the right and left rear wheel housing cover panels 40a, 40b and are respectively connected to rearmost portions of the right and left rear wheel housing cover panels 40a, 40b, respectively.

The molded trunk liner body 10 is formed of any suitable fibrous material that may readily be subjected to molding. While many textile fibers may be used, polyester staple fibers that have been needle punched or preneedled to form a non-woven fabric have been found to be quite suitable as well as economical to use. In the preferred embodiment shown herein, a moldable coating 11 is applied to the backside of the non-woven fabric and dried prior to being molded. This coating serves to impart shape retention and stiffness to the overall molded body upon the molding operation being completed. A relatively lightweight coating of thermoplastic material of a wide variety may be used. However, coatings of polyethylene or moldable latex have each been proven to be suitable, with latex offering the better shape retention. Conventional coating equipment is readily used with either type of coating. The upper surface of the trunk liner is desirably formed of soft fibrous material, preferably in the form of pile fibers. The back of the body of the trunk liner is relatively hard and rigid to provide the molded memory and shape retention for the trunk liner. Alternatively, instead of a coating, the desired moldability, stiffness and shape retention properties can be imparted to the trunk liner by other means such as by the composition of the fibrous material itself, as an example, through the use of a web containing heat activatable potentially adhesive fibers. One such product is disclosed in commonly owned U.S. Pat. No. 4,568,581.

Figure 3:
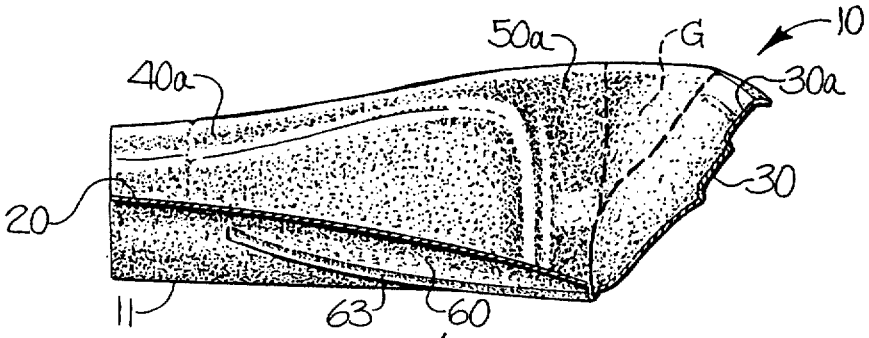
FIG. 3 is a vertical sectional view taken along Line 3—3 of both FIGS. 1 and 2.
Figure 4:
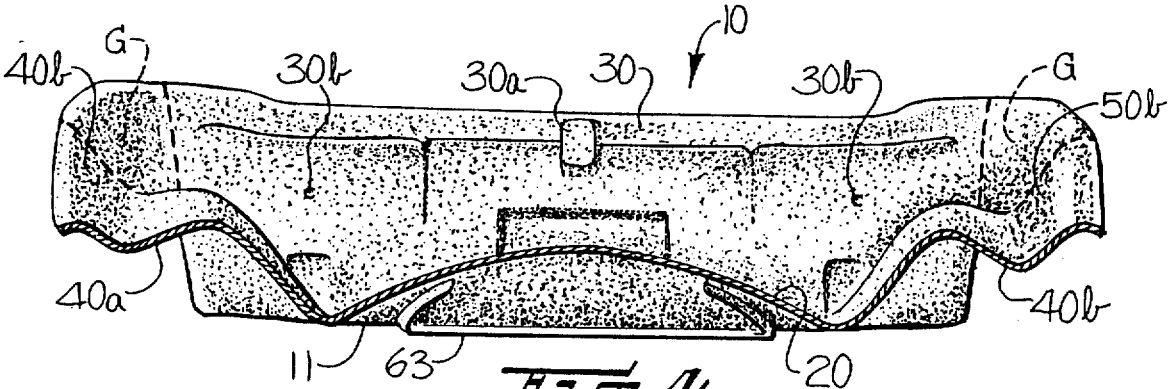
FIG. 4 is another vertical sectional view taken along line Line 4—4 of both FIGS. 1 and 2.

In order to facilitate the molding of the relatively deep fibrous body of the trunk liner, it will be noted that the center floor cover panel 20 is provided with an upward bulge or crown thereto, as best illustrated in FIGS. 3 and 4. This bulge or crown serves several purposes. Of primary importance is to prevent the fibrous body from being ruptured when the female and male mold components are moved into mating molding position. In this respect, it will be appreciated that the depth of movement or draw of the fibrous material forming the trunk liner is considerably lessened with this upward bulge being provided in the center floor cover panel 20. Also, as best illustrated in the schematic view of FIG. 5, it will be seen wherein the side panels extending upwardly and outwardly from the center floor cover panel 20 are essentially spread apart from each other to further reduce the depth of draw of the fibrous material molded into the trunk liner.

Figure 5:
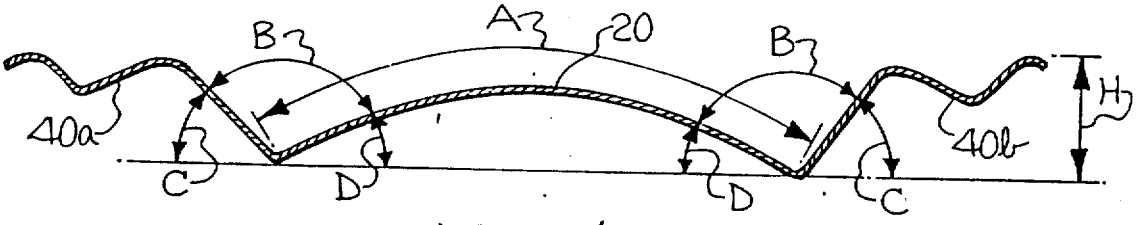
FIG. 5 is a schematic view of the molded trunk liner corresponding to the sectional view of FIG. 4.

As earlier noted, all of the plurality of panels extending along the sides of the center floor cover panel 20 are arranged to extend upwardly and outwardly therefrom so as to be in outwardly diverging relation thereto. FIG. 5 schematically illustrates this outwardly diverging relationship by the angles identified as B between the center floor cover panel 20 and the side walls 40a,40b extending therefrom. Each angle B is somewhat larger than 90°, and preferably is about 100° to 120°. The opposite ends of arc A represent the imaginary position of the sidewall panels if in fact the same were molded at only right angles to the center floor cover panel 20. Arc C is about 45° to 55° with arc D being about 25° to 30°. Thus, the collective arc for angles B, C, and D, is 180°.

Figure 6:
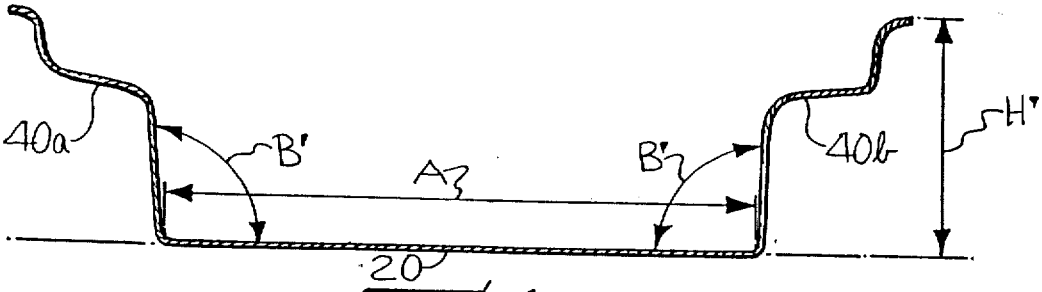
FIG. 6 is another schematic sectional view of the molded trunk liner and showing the attitude of the trunk liner when installed in the trunk of an automobile.

Referring now to FIG. 6 wherein the trunk liner is shown schematically in its attitude when installed in the trunk compartment of an automobile, it will be noted that the sidewalls of 40a and 40b have been biased inwardly to the more erect position and extend at an angle of somewhat more than 90° to the center floor cover panel 20. The side panels by being biased inwardly toward an upright position when mounted in the trunk facilitate mounting the trunk liner in the trunk of the automobile and the maintaining of the trunk liner in the installed position in engagement with the walls of the trunk. It will further be noted that the center floor cover panel 20, when installed, is in substantially flat condition. This flattening of the center floor cover panel 20 naturally occurs when the panels extending along the sides of the center floor cover panel 20 are biased inwardly toward an upright position when installed in the trunk compartment of an automobile. Further, it will be noted by comparing the molded height H of the trunk liner in FIG. 5, with the installed height H', of FIG. 6, that a considerable increase in overall height of the trunk liner takes place when the trunk liner is installed as compared to the height of the trunk liner when removed from the mold. Further, it has been learned that the crown in the center portion of the center floor cover panel 20 also aids in providing a biasing action to the sides extending outwardly and upwardly from the center floor panel.

The center floor cover panel 20 has a medial portion thereof defining a spare tire cover indicated by reference numeral 60. The periphery of the spare tire cover 60 is defined in the molding operation by providing suitable grooves 63 in the fibrous material. These grooves 63 as best shown in FIGS. 1 and 2, appear as bulging portions on the rear of the spare tire cover as illustrated in FIGS. 3 and 4. It will be noted that the grooves 63 take the form of two symmetrically arranged opposing arcuate groove segments, each extending from adjacent the rear end panel 30 forwardly across about two-thirds of the center floor cover panel. As will be seen later, as the description proceeds, these grooves 63 will each be cut in the valley thereof so as to free the sides of the spare tire cover from the remainder of the center floor cover panel 20.

Figure 7:
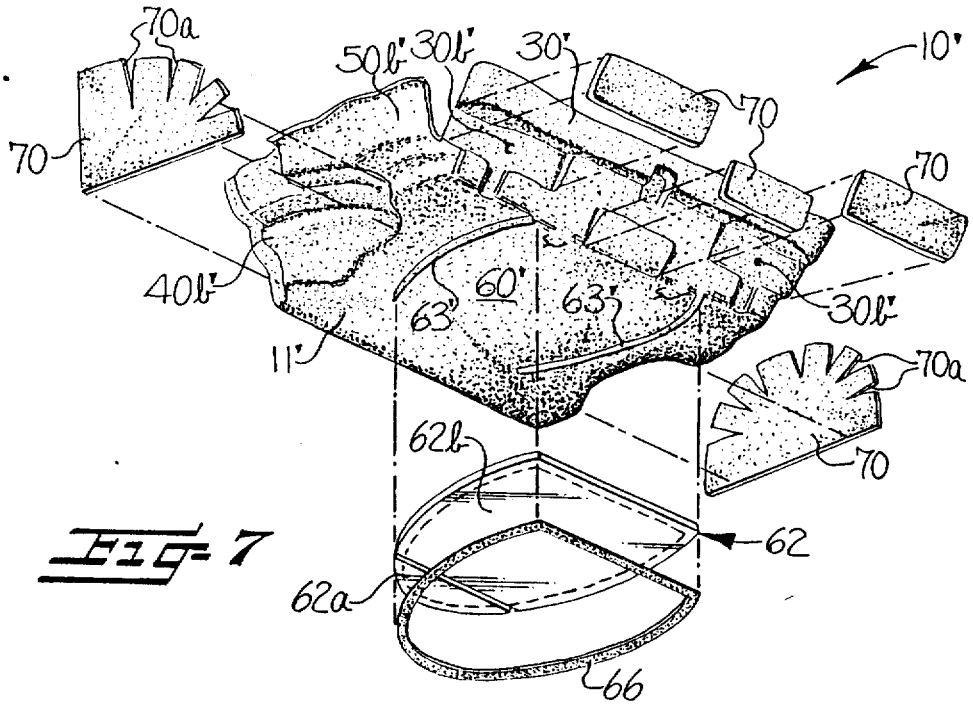
FIG. 7 is an exploded view of the completed trunk liner after the same has been suitably trimmed following molding and after the insulator pads have been applied at predetermined areas along the back of the various panels and wherein the panelboard for the rigid lid for the spare tire cover has been connected thereto.
Figure 8:
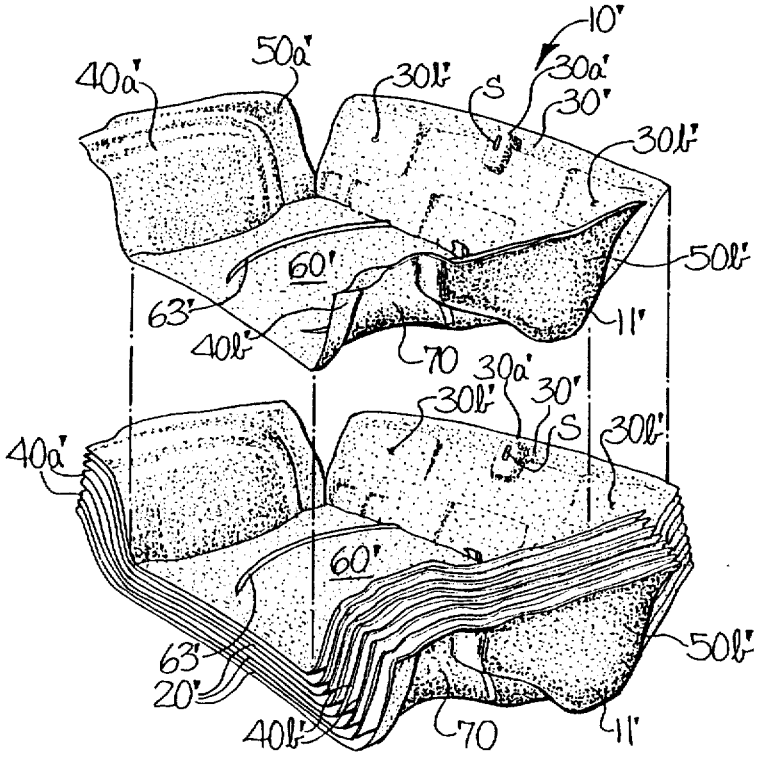
FIG. 8 is a perspective view of a stack of finished trunk liners shown nestingly arranged for facilitating shipment and handling thereof.
Figure 9:
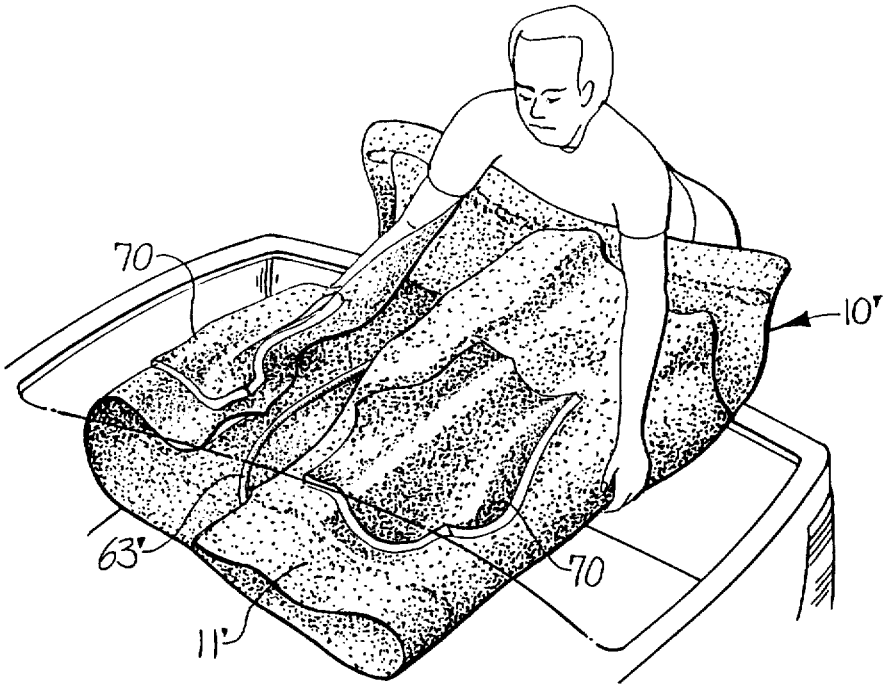
FIG. 9 illustrates the manner in which the rather bulky completed trunk liner may be suitably folded upon itself for facilitating installation in the trunk compartment of an automobile.
Figure 10:
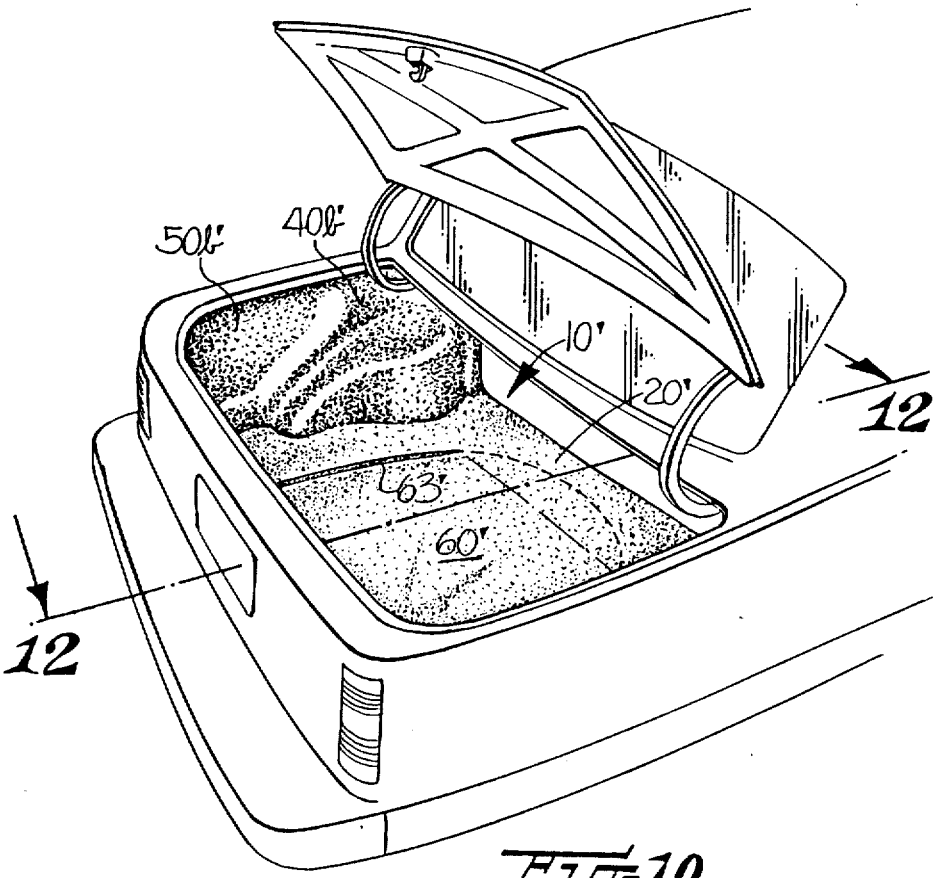
FIG. 10 is a top perspective view showing the trunk liner installed within the trunk compartment of an automobile.
Figure 16:
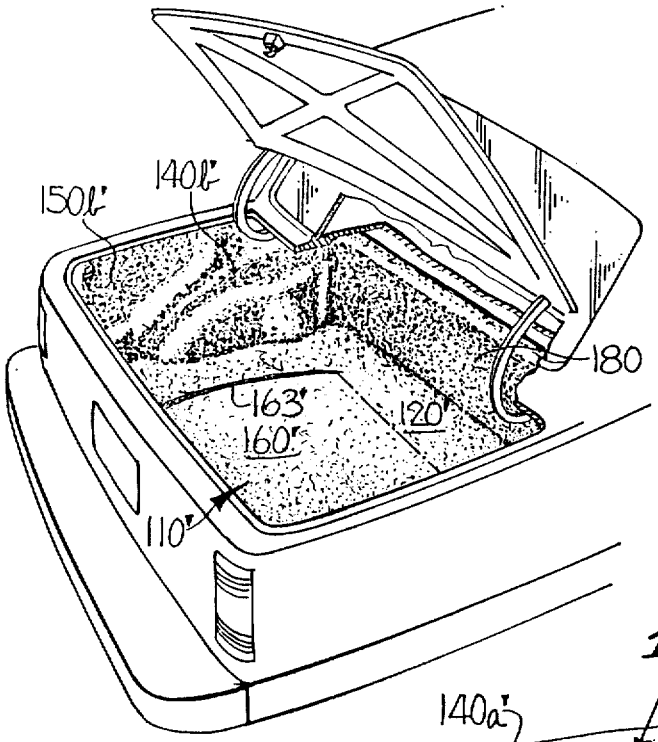
FIG. 16 is a top perspective view of a second form of the trunk liner installed in an automobile and which basically differs over the first form by the addition of a rear seat panel extending upwardly from forward portions of the trunk liner alongside the backrest of the back seat.
Figure 17:
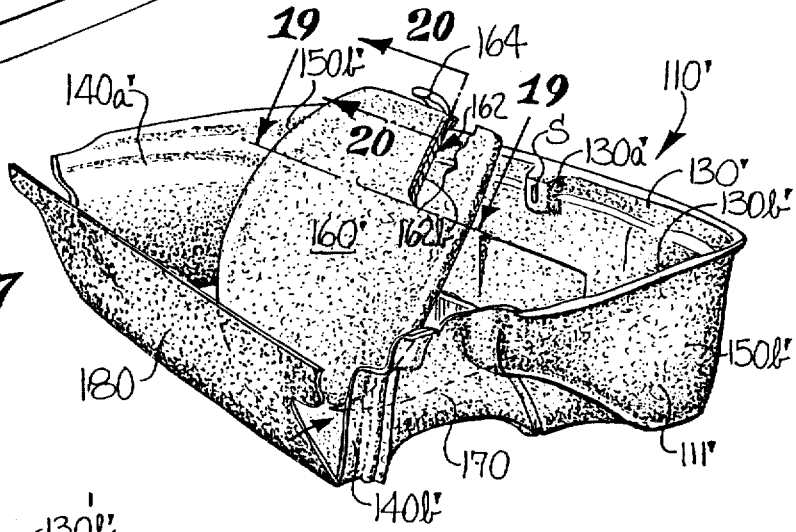
FIG. 17 is another top perspective view of the second form of the invention removed from an automobile but wherein the spare tire cover is shown pivoted to an open position and the rear seat panel is also shown moved away from the rear wheel housing cover panels for clarity.

Referring now particularly to FIGS. 7 and 8, reference numeral 10' designates the finished or completed trunk liner after the same has been suitably trimmed following the molding thereof and after insulator pads 70 have been added to predetermined areas of the backside thereof, as well as the providing of a rigid lid 62 underlying the spare tire cover 60 and for covering the spare tire well of the automobile. Comparing FIGS. 7 and 8 (wherein the prime notation has been added to molded liner elements) with FIGS. 1 and 2, it will be noted that gusset portions G in FIGS. 1 and 2, have been removed as by cutting along the dotted lines as indicated. The removal of these gussets G permits the rear end panel 30' to be moved substantially to the perpendicular position as when installaed, as best shown in FIG. 13. Similarly, as also shown in FIG. 13, the removal of the gussets G permit the right and left rear wheel housing cover panels 40a',40b', and right and left inner panels 50a', and 50b', to also be moved to the substantially vertical position. Also, since right and left inner panels 50a' and 50b' are integrally connected to the right and left rear wheel housing cover panels 40a',40b', these inner panels 50a',50b' may also be moved to the substantially vertical position upon the removal or trimming of the gussets G from the molded liner 10.

Referring now to the spare tire cover 60', as best shown in the exploded view of FIG. 7, the spare tire cover 60' is provided with a multi-piece rigid lid 62 on the backside thereof and which is suitably secured to the cover as by a suitable adhesive such as a heat activatable hot melt adhesive. As illustrated in FIG. 7, the multipiece rigid lid 62 takes the form of a relatively small forwardmost piece 62a and a considerably larger rearwardmost piece 62b. As illustrated, these lid pieces 62a,62b are spaced apart from each other and have adjacent parallel edge portions essentially defining a hinge line therebetween for the spare tire cover 60'.

Referring now to FIGS. 11 and 12, it will be seen that when the spare tire cover is hinged to the open position that the relatively small forwardmost lid piece 62a of the rigid lid 62 remains intact while the larger lid piece 62b is pivoted upwardly along the hinge line defined by the adjacent parallel edge portions of the two lid pieces. The two lid pieces 62a,62b of the lid 62 may be formed of any suitable rigid material such as panelboard, compressed board, or the like. Further, to facilitate grasping and imparting pivotal movement to the spare tire cover 62, a pull strap 64 is suitably connected as by staples 65 to a substantially central location along the rear periphery of the lid, as illustrated. This is best illustrated in FIGS. 11, 12, 13 and 15, of the drawings.

To cushion the underside of the rigid lid 62 and to prevent rattling as by engagement of the lid with the underlying metal defining the opening of the spare tire well, a relatively narrow strip of cushion material 66 is suitably secured as by adhesive, such as hot melt, to the underside of the lid pieces 62a,62b of the lid 62. The cushion material 66 may be a fibrous non-woven needle punched material, and is relatively narrow and of about an inch in width to serve this cushioning and insulating function to prevent rattling.

Referring again more particularly to the exploded view of FIG. 7, it will be seen wherein a plurality of fibrous insulator pads 70 of various thicknesses are secured to the backside of predetermined areas of the plurality of panels extending upwardly and outwardly from the center floor cover panel 60'. It will be noted that three rectangular shaped insulator pads 70 are shown secured to the backside of the rear end panel 30' and that relatively large quadrant shaped insulator pads 70 are secured to the backside of the right and left rear wheel housing cover panels 40a',40b'. It will be noted that these latter insulator pads have notches 70a cut inwardly from the periphery thereof so that the pads may readily be accommodated to the arcuate inner surfaces of the wheel housing cover panels. These insulator pads 70 may be secured to the molded trunk liner by any suitable adhesive, which may also be of the hot melt type of adhesive.

Referring again to the spare tire cover 60', and particularly FIG. 14, it will be noted that the grooves 63' which define the periphery of the spare tire cover are suitably cut, as illustrated, in the bottom of the valley of the grooves. The depth of the grooves and the cutting in the valley thereof aids in obscuring the presence of the cut line and imparts continuity to the exposed surface of the trunk liner by shielding the cut line from view.

Desirably for facilitating handling during shipment and installation, the rearmost portion of the spare tire cover 60' will not be entirely severed so as to be entirely free from rear end panel 30' but will have a pair of spaced uncut portions therebetween which will be severed upon the trunk liner being installed in the automobile. By having these small uncut areas, free pivotal movement of the spare tire cover is avoided which would interfere with the handling and installation of the trunk liner. In this regard, attention is directed to FIG. 9, wherein the trunk liner 10' is shown in a condition of being folded upon itself as being installed in the trunk compartment of an automobile. Typically, opposite sides of the liner, as illustrated, are folded to overlie the spare tire cover to thus reduce the overall width of the trunk liner when being inserted in the opening of the trunk compartment. It should also be appreciated that the rigid lid 62 for the spare tire well, which underlies the spare tire cover 60', also essentially serves as a carrying platform for the liner, opposite sides of which rigid lid 62 may be gripped by the installer (as illustrated) for facilitating the movement of the trunk liner into the compartment of the trunk.

Referring to FIGS. 8 and 13, it will be noted that the rear end panel 30' has a forwardly bulging portion 30a in the upper central portion thereof, and that a slot S is provided therethrough. This bulging portion 30a' accommodates therebehind the latching mechanism for the automobile trunk lid with the slot S serving to permit protrusion therethrough of the loop portion L of the lock, as best illustrated in FIGS. 11 and 12.

For prelocating in the trunk liner, the desired position for a pair of metal fasteners or screws for aiding in mechanically securing the rear end panel 30' to the adjacent wall of the trunk compartment, indentations 30b' are molded in the rear end panel 30', each of the indentations 30b' being positioned about half way between the trunk latch and the opposite ends of the rear end panel 30.

Figure 18:
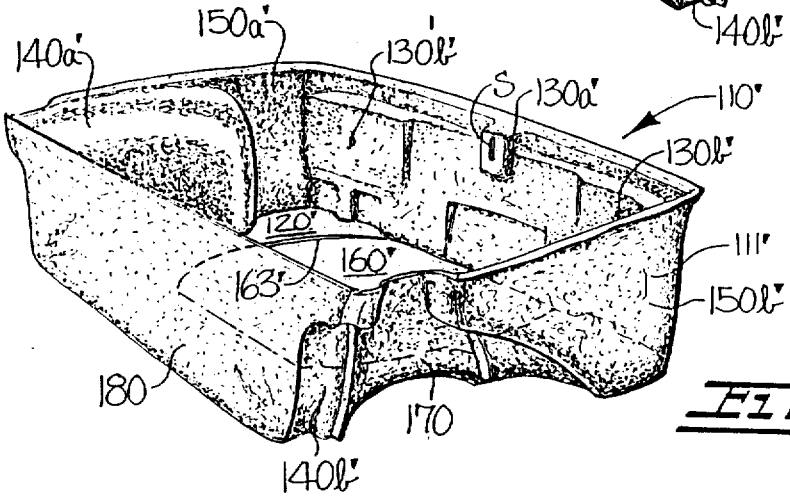
FIG. 18 is another top perspective view of the second form of the completed trunk liner as the same would appear when removed intact from the trunk compartment of a vehicle.
Figure 19:
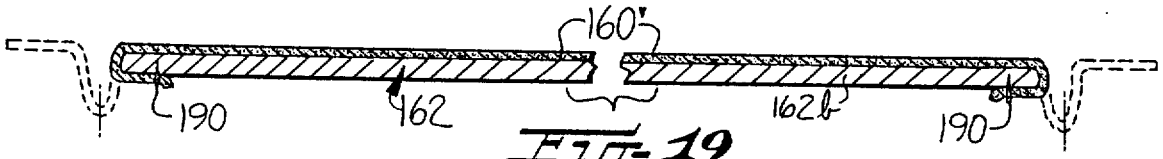
FIG. 19 is a transverse sectional view of the spare tire cover taken substantially along Line 19—19 of FIG. 17, but on an enlarged scale and illustrating the manner in which the trunk liner material is positioned around the periphery and the underside of the rigid lid.
Figure 20:
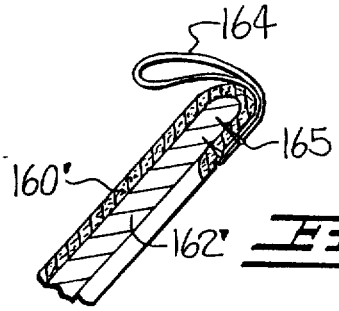
FIG. 20 is a fragmentary sectional view of the spare tire cover taken substantially along Line 20—20 of FIG. 17, and illustrating the manner in which the pull strap is secured to the spare tire cover for facilitating pivoting the cover to an open position.
Figure 21:
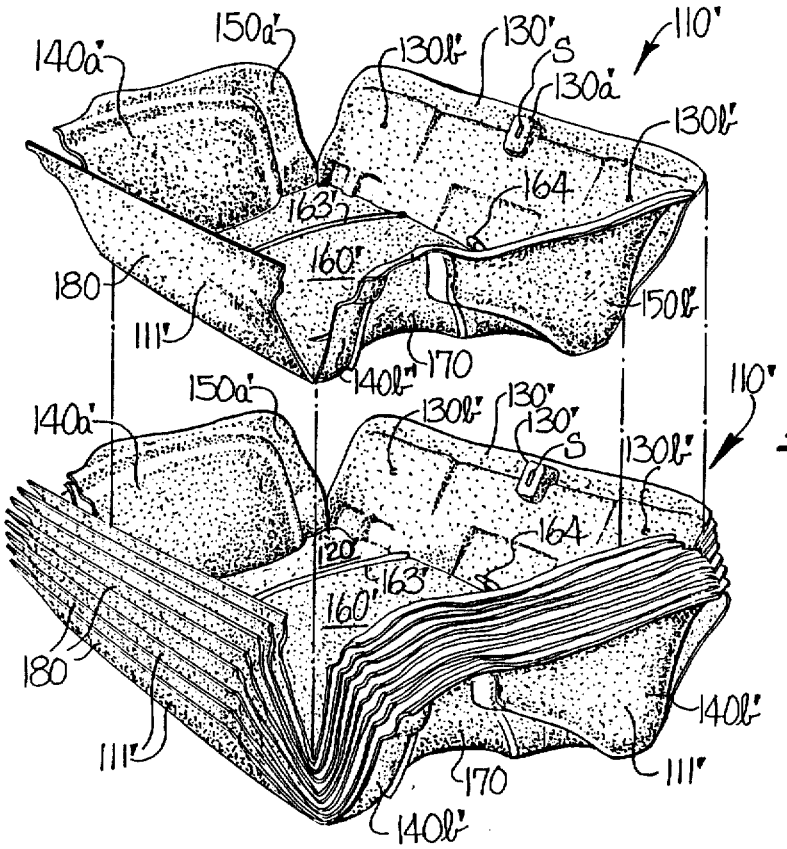
FIG. 21 is a perspective view of a stack of finished trunk liners of the second form shown nested for facilitating handling and shipping thereof.

Referring now to the second embodiment of the invention as illustrated in FIGS. 16 to 21, the same reference numerals will be employed as in the first embodiment but of the hundred series, i.e. the numerals will be numbered a hundred higher. This second form of the invention basically differs over the first form in two respects, one being the inclusion of a rear seat panel 180 which has lower end portions connected to forwardmost portions of the center floor cover panel 120' and extends upwardly and outwardly from the center floor panel in a diverging relationship as best illustrated in FIG. 21, where the completed trunk liner is shown ready for shipment. Secondly, this form of the invention avoids the need of separate strip cushion material 66 for insulating the underside of the rigid lid 162 for the spare tire cover well. In this form of the invention, the grooves 163' formed along the periphery of the spare tire cover 160' are considerably deeper so as to provide sufficient liner material in the groove so as to be turned or folded underneath the peripheral edge portions of the rigid lid 162. This feature of the invention is best illustrated in FIGS. 19 and 20, wherein it will be seen that portions of the spare tire cover material extend underneath the lid 162 adjacent the periphery. Suitable means such as staples 190 or hot melt adhesive may be provided for securing the turned under liner material in position on the underside of the lid 162.

This form of the invention has two pairs of gussets G (not shown) that have been removed in order to permit the side walls 140a', 140b', 150a', 150b', 130; and 180 extending upwardly and outwardly from the center floor cover panel 120 to be moved to the substantially vertical position when installed in the trunk compartment of an automobile. This positioning of these side panels in the vertical position as they would appear in the trunk compartment of an automobile, is best illustrated in FIG. 18 when comparing the same to the completed trunk liners as nestingly shown in FIG. 21.

As in the first form of the invention, it is desirable to leave spaced areas of the spare tire cover 160' uncut along the lower edge of the rear end panel 130' for facilitating the handling of the trunk liner when shipping and installing the same.

It will thus be seen that both forms of the invention present a one-piece trunk liner having an integral molded, relatively stiff fibrous body having a center floor cover panel and a plurality of panels extending along the sides of center floor cover panel and integrally connected thereto and wherein the panels extend upwardly and outwardly from the center floor cover panel so as to be in outwardly diverging relation to the center floor cover panel. The stiffness and shape retention of the molded fibrous body and the outwardly diverging relationship of the plurality of panels cause the panels to resiliently engage and hug the inner wall surfaces of the trunk compartment when the panels are biased inwardly toward an upright position when mounted in the trunk. This diverging relationship of the side panels facilitates the mounting of the trunk liner in the trunk of the automobile and further serves to maintain the trunk liner in the installed position in engagement with the walls of the trunk. Further, no longer does the trunk liner take the form of a pieced together jigsaw of a plurality of pieces as in the past, but instead presents an integrally molded trunk liner aesthetically pleasing in appearance and easy to install.

That which is claimed is:

1. A one-piece trunk liner for an automobile trunk compartment, said trunk liner comprising an integral molded relatively stiff fibrous body having a center floor cover panel, and a plurality of panels extending along the sides of said center floor cover panel and integrally connected thereto, said plurality of panels extending upwardly and outwardly from said center floor cover panel so as to be in outwardly diverging relation to said center floor cover panel, said stiffness of said molded fibrous body and the outwardly diverging relationship of said plurality of panels causing said panels to [resiliently engage] *be resiliently biased into close proximity to* inner wall surfaces of the trunk when the panels are [biased inwardly] *moved* toward an upright position when mounted in the trunk to thereby facilitate mounting the trunk liner in the trunk of the automobile and maintaining the trunk liner in the installed position in [engagement with] *said close proximity to* the walls of the trunk.

2. A one-piece trunk liner for an automobile trunk compartment, said trunk liner comprising a relatively thin shell-like integral molded and relatively stiff fibrous body formed of textile fibers, said body having a relatively soft fibrous upper surface and including a center floor cover panel, and a plurality of panels extending along the sides of said center floor cover panel and integrally connected thereto, said plurality of panels extending upwardly and outwardly from said center floor cover panel so as to be in outwardly diverging relation to said center floor cover panel, said stiffness of said molded fibrous body and the outwardly diverging relationship of said plurality of panels causing said panels to [resiliently engage] *be resiliently biased into close proximity to* inner wall surfaces of the trunk when the panels are [biased inwardly] *moved* toward an upright position when mounted in the trunk to thereby facilitate mounting the trunk liner in the trunk of the automobile and maintaining the trunk liner in the installed position in [engagement with] *said close proximity to* the the walls of the trunk.

3. A one-piece trunk liner for an automobile trunk compartment, said trunk liner comprising an integral molded relatively stiff fibrous body having a center floor cover panel, and a plurality of panels extending along the sides of said center floor cover panel and integrally connected thereto, said plurality of panels comprising a rear end panel having lower end portions connecting rearmost portions of said center floor cover panel and divergingly extending upwardly and outwardly therefrom, right and left rear wheel housing cover panels respectively connected to opposite sides of said floor cover panel and divergingly extending upwardly and outwardly therefrom, and right and left inner panels respectively connected to opposite sides of said center floor cover panel and divergingly extending upwardly and outwardly therefrom, said right and left inner panels being rearwardly of said right and left rear wheel housing cover panels and respectively connected to rearmost portions of said right and left rear wheel housing cover panels, said stiffness of said molded fibrous body and the outwardly diverging relationship of said plurality of panels causing said panels to [resiliently engage] *be resiliently biased into close proximity to* inner wall surfaces of the trunk when the panels are [biased inwardly] *moved* toward an upright position when mounted in the trunk to thereby facilitate mounting the trunk liner in the trunk of the automobile and maintaining the trunk liner in the installed position in [engagement with] *said close proximity to* the walls of the trunk.

4. A trunk liner according to claims 1, 2 or 3 including a thermoplastic coating on the backside of said fibrous body imparting hardness to the backside and overall stiffness and shape retention to the fibrous body.

5. A trunk liner according to claims 1, 2 or 3 wherein a spare tire cover is provided in medial portions of said center floor cover panel, said spare tire cover being in the form of a flap hingedly connected along a forwardmost side to said center floor cover panel.

6. A trunk liner according to claims 1, 2 or 3 wherein a spare tire cover is provided in medial portions of said center floor cover panel, said spare tire cover being in the form of a flap hingedly connected along a forwardmost side to said center floor cover panel, a rigid lid carried by said spare tire cover on the backside thereof and adapted to overlie and cover a spare tire well in the trunk of a car, said spare tire cover having flap edge portions overlying and covering the periphery of said rigid lid to prevent an aesthetically pleasing appearance thereto and serving to shield the juncture of the spare tire cover with adjacent areas of the center cover panel.

7. A trunk liner according to claim 6 wherein said flap edge portions of said spare tire cover extend underneath said rigid lid adjacent the periphery of said lid and serve for preventing contact of said lid with underlying metal typically forming the opening of the spare tire well.

8. A trunk liner according to claim 6 including a relatively narrow strip of cushioning material connected to the underside of said lid of said spare tire cover adjacent the periphery of the lid for eliminating contact of the lid with underlying metal typically forming the opening of the spare tire well.

9. A trunk liner according to claim 6 wherein said rigid lid for covering a spare tire well is of multipiece construction and includes a relatively small forwardmost piece and a considerably large rearmost piece, said lid pieces being spaced apart from each other and having adjacent parallel edge portions essentially defining a hinge line therebetween for the spare tire cover.

10. A trunk liner according to claims 1, 2, or 3 wherein said plurality of panels diverge outwardly from said center floor cover panel at angles within the range of about 100° to about 120°.

11. A trunk liner according to claims 1, 2, or 3 wherein said center floor cover panel is crowned to provide an upward bulge thereto for facilitating molding thereof.

12. A trunk liner according to claims 1, 2 or 3, including insulator pads secured to the backside of predetermined areas of said plurality of panels for acoustical and thermal insulation.

13. A trunk liner according to claim 1, 2 or 3, including fibrous insulator pads of various thicknesses secured to the backside of predetermined areas of said plurality of panels for acoustical and thermal insulation.

14. A trunk liner according to claim 1, 2 or 3 wherein said trunk liner is of a relatively thin shell-like construction and wherein said shell-like construction and said outwardly diverging relation of said plurality of panels extending along the sides of said center floor cover panel impart nestability to the trunk liner to permit a plurality of the trunk liners to be compactly nested with each other to form a nested stack of trunk liners to thereby facilitate the handling and shipping of trunk liners.

15. A trunk liner according to claim 3 including a rear seat panel having lower end portions connecting forwardmost portions of said center floor cover panel and extending upwardly and outwardly from said center floor panel in a diverging relationship.

16. The combination with an automobile trunk compartment of a one-piece trunk liner, said trunk liner comprising an integral molded relatively stiff fibrous body having a center floor cover panel, and a plurality of panels extending along the sides of said center floor cover panel and integrally connected thereto, said plurality of panels being molded to extend upwardly and outwardly from said center floor cover panel so as to be in outwardly diverging relation to said center floor cover panel when uninstalled, said stiffness of said molded fibrous body and the outwardly diverging relationship of said plurality of panels causing said panels to [resiliently engage] *be resiliently biased into close proximity to* the inner wall surfaces of the trunk to facilitate maintaining the trunk liner in [engagement with] *said close proximity to* the walls of the trunk.

17. The combination with an automobile trunk compartment of a one-piece trunk liner, said trunk liner comprising a relatively thin shell-like integral molded and relatively stiff fibrous body formed of textile fibers, said body having a relatively soft fibrous upper surface and including a center floor cover panel, and a plurality of panels extending along the sides of said center floor cover panel and integrally connected thereto, said plurality of panels extending upwardly and outwardly from said center floor cover panel so as to be in outwardly diverging relation to said center floor cover panel when uninstalled, said stiffness of said molded fibrous body and the outwardly diverging relationship of said plurality of panels causing said panels to [resiliently engage] *be resiliently biased into close proximity to* inner wall surfaces of the trunk to facilitate maintaining the trunk liner in [engagement with] *said close proximity to* the walls of the trunk.

18. The combination with an automobile trunk compartment of a one-piece trunk liner, said trunk liner comprising an integral molded relatively stiff fibrous body having a center floor cover panel, and a plurality of panels extending along the sides of said center floor cover panel and integrally connected thereto, said plurality of panels comprising a rear end panel having lower end portions connecting rearmost portions of said center floor cover panel and divergingly extending upwardly and outwardly therefrom, right and left rear wheel housing cover panels respectively connected to opposite sides of said floor cover panel and divergingly extending upwardly and outwardly therefrom, and right and left inner panels respectively connected to opposite sides of said center floor cover panel and divergingly extending upwardly and outwardly therefrom, said right and left inner panels being rearwardly of said right and left rear wheel housing cover panels and respectively connected to rearmost portions of said right and left rear wheel housing cover panels, said stiffness of said molded fibrous body and the outwardly diverging relationship of said plurality of panels causing said panels to [resiliently engage] *be resiliently biased into close proximity to* inner wall surfaces of the trunk to facilitate maintaining the trunk liner in [engagement with] *said close proximity to* the walls of the trunk.

19. The combination with an automobile trunk compartment of a one-piece trunk liner according to claims 16, 17, or 18, including a thermoplastic coating on the backside of said fibrous body of said trunk liner imparting hardness to the backside and overall stiffness to the fibrous body.

20. The combination with an automobile trunk compartment of a one-piece trunk liner according to claims 16, 17, or 18, wherein a spare tire cover is provided in medial portions of said center floor cover panel of said trunk liner, said spare tire cover being in the form of a flap hingedly connected along a forwardmost side to said center floor cover.

21. The combination with an automobile trunk compartment of a one-piece trunk liner according to claims 16, 17, or 18, wherein a spare tire cover is provided in medial portions of said center floor cover panel of said trunk liner, said spare tire cover being in the form of a flap hingedly connected along a forwardmost side to said center floor cover, a rigid lid carried by said spare tire cover on the backside thereof and adapted to overlie and cover a spare tire well in the trunk of a car, said spare tire cover having flap edge portions overlying and covering the periphery of said rigid lid to present an aesthetically pleasing appearance thereto and serving to shield the juncture of the spare tire cover with adjacent areas of the center cover panel.

22. The combination with an automobile trunk compartment of a one-piece trunk liner according to claims 16, 17, or 18, wherein said flap edge portions of said spare tire cover extend underneath said rigid lid adjacent the periphery of said lid and serve for preventing contact of said lid with underlying metal typically forming the opening of the spare tire well.

23. The combination with an automobile trunk compartment of a one-piece trunk liner according to claims 16, 17, or 18, including a relatively narrow strip of cushioning material connected to the underside of said lid of said spare tire cover adjacent the periphery of the lid for eliminating contact of the lid with underlying metal typically forming the opening of the spare tire well.

24. The combination with an automobile trunk compartment of a one-piece trunk liner according to claims 16, 17, or 18, including insulator pads secured to the backside of predetermined areas of said plurality of trunk liner panels for acoustical and thermal insulation.

25. The combination with an automobile trunk compartment of a one-piece trunk liner according to claims 16, 17, or 18, including fibrous insulator pads of various thicknesses secured to the backside of predetermined areas of said plurality of trunk liner panels for acoustical and thermal insulation.

*26. A trunk liner according to claims 1, 2 or 3, wherein said plurality of panels resiliently engage said inner wall surfaces of the trunk when the panels are moved toward an upright position when mounted in the trunk.*

*27. The combination with an automobile trunk compartment of a one-piece trunk liner according to claims 16, 17 or 18, wherein said plurality of panels resiliently engage said inner wall surfaces of the trunk when the panels are moved toward an upright position when mounted in the trunk.*

* * * * *